United States Patent

Frank et al.

[15] 3,678,100
[45] July 18, 1972

[54] 2-HALOPERFLUORO-1-CYCLOALKEN-1-YL PHOSPHORYL COMPOUNDS AND PROCESS FOR THE PREPARATION THEREOF

[72] Inventors: Arlen W. Frank, Grand Island, N.Y.; Charles F. Baranauckas, Memphis, Tenn.

[73] Assignee: Borg-Warner Corporation, Chicago, Ill.

[22] Filed: Sept. 5, 1969

[21] Appl. No.: 870,801

Related U.S. Application Data

[62] Division of Ser. No. 438,106, March 8, 1965, Pat. No. 3,505,433.

[52] U.S. Cl. ............260/502.4 R, 23/14.5, 210/38, 252/89, 260/78 R, 260/2.8 R, 260/464, 260/502.5, 260/614 R, 260/153
[51] Int. Cl. ............................C07f 9/38, C11d 1/34
[58] Field of Search ............................260/502.4

[56] References Cited

UNITED STATES PATENTS 2,486,657  11/1949  Kosolapoff ............260/502.4
2,594,454   4/1952  Kosolapoff ............260/502.4
3,202,692   8/1965  Weil et al. ............260/502.4
3,419,595  12/1968  Hansen ...............260/502.4

OTHER PUBLICATIONS

Knunyants et al., "Izv. Akad. Navk. USSR, Ser. Khm." (1964), pp. 1797–1801.

Primary Examiner—Bernard Helfin
Assistant Examiner—Joseph E. Evans
Attorney—William S. McCurry and Roger A. Schmiege

ABSTRACT

A process for the preparation of a compound selected from the group consisting of 2-haloperfluoro-1-cycloalken-1-ylphosphonic acid and 2-haloperfluoro-1-cycloalken-1-yl phosphinic acid, which comprises hydrolyzing the corresponding compound of the formula

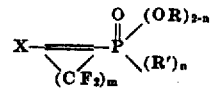

wherein X is selected from the group consisting of chlorine and bromine, R and R' are organic radicals, $m$ is from 2 to 4, and $n$ is from 0 to 1.

3 Claims, No Drawings

2-HALOPERFLUORO-1-CYCLOALKEN-1-YL PHOSPHORYL COMPOUNDS AND PROCESS FOR THE PREPARATION THEREOF

This is a division of our parent application, Ser. No. 438,106, filed Mar. 8, 1965.

This invention relates to novel halogenated organophosphorus compounds and a method for preparing the same. More particularly, it relates to cyclic perfluoroolefins containing a halogen and a phosphoryl (P=O) group on adjacent unsaturated carbon atoms.

It is an object of this invention to prepare novel 2-haloperfluoro-1-cycloalken-1-ylphosphoryl compounds. Other objects of the invention will be apparent from the following detailed description.

The novel compounds of this invention have the formula

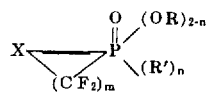

wherein X is selected from the group consisting of chlorine and bromine, R and R' are organic radicals independently selected from the group consisting of alkyl and substituted alkyl having from one to 12 carbon atoms, the most preferred of these have one to six carbon atoms; aryl and substituted aryl having from six to 15 carbon atoms, the most preferred of these have six to nine carbon atoms; aralkyl and substituted aralkyl having from seven to 20 carbon atoms, the most preferred of these have seven to 10 carbon atoms; alkenyl and substituted alkenyl having from two to 12 carbon atoms, the most preferred of these have two to six carbon atoms; cycloalkyl and substituted cycloalkyl having from three to 15 carbon atoms, the most preferred of these have three to eight carbon atoms; and heterocyclic and substituted heterocyclic having from one to 15 carbon atoms, the most preferred of these have one to eight carbon atoms, m is from two to four and n is from 0 to 2.

The substituents present on the alkyl, aryl, aralkyl, alkenyl, cycloalkyl and heterocyclic radicals may be halogen, nitro, amino, substituted amino, hydroxy, alkoxy, mercapto, carbonyl, carboxy, cyano, and the like.

In accordance with the practice of this invention it has been found that the novel compounds of this invention can be prepared in excellent yields by reacting a perfluorocycloalkene (hereinafter referred to as cycloalkene) selected from the group consisting of 1-chloroperfluorocycloalkene and 1-bromoperfluorocycloalkene, the most preferred of these are 1-chloropentafluorocyclobutene, 1-chloroheptafluorocyclopentene and 1-chlorononafluorocyclohexene, with a phosphorus-containing compound of the formula

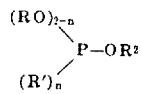

wherein R and R' are as previously defined, R² is selected from the group consisting of alkyl and substituted alkyl having from one to 12 carbon atoms, the most preferred of these have one to six carbon atoms; aralkyl and substituted aralkyl having from seven to 20 carbon atoms, the most preferred of these have seven to 10 carbon atoms; alkenyl and substituted alkenyl having from two to 12 carbon atoms, the most preferred of these have two to six carbon atoms; cycloalkyl and substituted cycloalkyl having from three to 15 carbon atoms, the most preferred of these have three to eight carbon atoms, and n is from 0 to 2.

Typical phosphorus-containing compounds which may be employed in the practice of this invention include triesters of phosphorous acid, such as trimethyl phosphite, triethyl phosphite, triisopropyl phosphite, tributyl phosphite, diethyl butyl phosphite, ethyl propylene phosphite, methyl phenylene phosphite, tris(2-chloroethyl) phosphite, triallyl phosphite, and tris(2-butoxyethyl) phosphite; diesters of phosphonous acids, such as diethyl ethylphosphonite, diethyl phenylphosphonite, dibutyl hexylphosphonite, and bis(2-chloroethyl) benzylphosphonite; and esters of phosphinous acids, such as ethyl diphenylphosphinite; butyl dihexylphosphinite, allyl diethylphosphinite, and the like.

The cycloalkenes employed in the practice of the invention, and previously described, may be prepared by the partial fluorination of the corresponding 1,2-dihalo perfluorocycloalkene with potassium fluoride in dimethylformamide.

The following equation, wherein the cycloalkene is reacted with a dialkyl arylphosphonite, illustrates generally this invention:

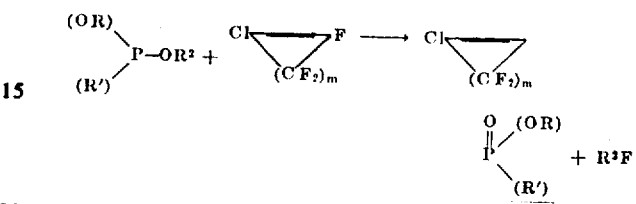

In the practice of this invention the cycloalkene and the phosphorus-containing compound may be reacted in any suitable reaction vessel, so that, the reaction may be continuous, intermittent or batch-type. The reactants may be reacted or added to the reaction zone simultaneously, as for example when the reaction is carried out continuously in a column, or in any sequence, as for example when the reaction is carried out batchwise, without departing from the scope of this invention. Conveniently, the phosphorus ester may be added to the cycoalkene so that the ester is never present in excess in the reaction zone.

In general, the reaction takes place at temperatures ranging from 0° to 200° C., preferably ranging from 10° to 180° C., and most preferably ranging from 20° to 120° C. Atmospheric pressure is usually employed, but pressure in excess or less than atmospheric may also be employed. For example, when R² is methyl or ethyl, so that a gaseous by-product is formed, the reaction is conveniently carried out at atmospheric pressures, and preferably at a temperature in the range of 20° C. and the boiling point of the cycloalkene. When R² is such that the organic halide formed is not volatile, the reaction is conveniently carried out in a sealed vessel under autogenous pressure.

If desired, the reaction may be carried out in the presence of an organic solvent, such as a hydrocarbon or a alcohol, although the use of a solvent is not ordinarily essential. Removal of the evolved organic halide may be facilitated if the solvent chosen is such as to permit azeotropic distillation. Typical examples of such solvent include toluene, xylene, and the like.

The relative amounts of the reactants employed may vary, although it is desirable that excesses of either reactant be avoided. The molar ratio of phosphorus ester to cycloalkene may be between 0.5 to 6 moles of phosphorus ester per mole of cycloalkene, preferably between 0.5 to 3 moles of phosphorus-containing compound per mole of cycloalkene, the most preferred molar proportion being a substantially stoichiometric proportion of one mole of phosphorus-containing compound to one mole of cycloalkene.

After the reaction has been conducted for a period of time sufficient to obtain the maximum yield, generally from 10 minutes to 10 hours, the reaction product is separated from the reaction mixture. The separation may be accomplished by any suitable means which include distillation, extraction, and the like.

It has also been found, unexpectedly, that the reaction of cycloalkenes with phosphorous-containing compounds produces novel by-products of the formula

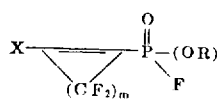

wherein X is selected from the group consisting of chlorine and bromine, R is as previously defined, and m is from 2 to 4.

The compounds of this invention may be converted by suitable methods to useful derivatives. For example, the phosphonate esters of this invention may be hydrolyzed to yield phosphonic acids of the formula

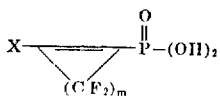

wherein X is selected from the group consisting of bromine and chlorine, and m is from 2 to 4. While the phosphinate esters of this invention may be hydrolyzed to yield phosphinic acids of the formula

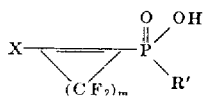

wherein X is selected from the group consisting of chlorine and bromine, R' is as previously defined, and m is from 2 to 4.

Additionally, the esters of this invention may be reacted with phosphorous pentachloride or phosphorus pentabromide to yield monophosphoryl halide compounds of the formula

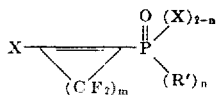

wherein X is selected from the group consisting of chlorine and bromine, R' is an organic radical as previously described, m is from 2 to 4, and n is from 0 to 1.

The monophosphoryl halides, that is, the phosphonic and phosphinic acid halides of this invention, may also be prepared by the reaction of a diphosphoryl ester of the formula

wherein R and R' are organic radicals as previously described, m is from 2 to 4, and n is from 0 to 2, with a phosphorus pentahalide selected from the group consisting of phosphorus pentachloride and phosphorus pentabromide, whereby a cleavage of one of the C—P bonds occurs, producing monophosphoryl halide compounds as defined above.

The diphosphoryl esters employed in the preparation of these acid halides are prepared by a method described in a co-pending application filed Mar. 8, 1965, and illustrated herein by example 8.

Advantageously, unsymmetrical diphosphoryl esters of the formula

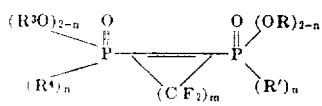

wherein $R^3$ and $R^4$ are independently selected from the group consisting of R and R' as previously defined, and R and R' are as previously defined, m is from 2 to 4, and n is from 0 to 2, may be employed to obtain the phosphinic and phosphonic acid halides. Said unsymmetrical diphosphoryl esters are prepared by a method described in a co-pending application filed of even date herewith.

Additionally, the compounds of this invention are generally useful as leveling agents for floor waxes, where they also contribute a resistance to water spotting; as plasticizers for polyvinyl chloride resins; as cell modifiers for urethane foams; and as surface active agents. They are particularly useful as metal extractants and sequestering agents, for example in the extraction of uranium and thorium.

The following examples are presented to illustrate the novel compounds of this invention and their preparation. It is to be understood that the examples are not to be construed as limiting the invention except as defined in the appended claims. All temperatures are in degrees centigrade and all parts are by weight, unless otherwise mentioned.

EXAMPLE 1

49.6 parts of trimethyl phosphite were added dropwise over a 30 minute period to 91.4 parts of 1-chloro-2,3,3,4,4,5,5-heptafluorocyclopentene, with external cooling as required to maintain the temperature between 25° and 35° C.. The reaction was exothermic and a gas was evolved. Following the addition, the reaction mixture was stirred at room temperature until the exotherm subsided, and was then heated briefly to 100° C.. A test for unreacted phosphite was negative. The solution was twice distilled, giving a 38 percent yield of dimethyl-2-chloro-3,3,4,4,5,5-hexafluoro-1-cyclopenten-1-ylphosphonate as a colorless, fuming liquid, boiling point 64°–66 C. at 4.5 millimeters absolute pressure, refractive index ($n^{25}D$) 1.3817, density ($d^2_4{}^0$) 1.6669. The product contained 11.1 percent chlorine, 9.9 percent phosphorus. The calculated percentages of these elements in $C_7H_6ClF_6O_3P$ are 11.13 percent chlorine, 9.73 percent phosphorus. This product is a new compound having the structure

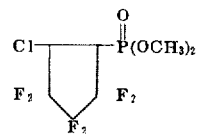

EXAMPLE 2

166.0 parts of triethyl phosphite were found to react smoothly with 228.5 parts of 1-chloro-2,3,3,4,4,5,5-heptafluorocyclopentene, following the procedure of example 1, giving 130.4 parts of diethyl-2-chloro-3,3,4,4,5,5-hexafluoro-1-cyclopenten-1-ylphosphonate. This product was taken up in ether, washed with water, dried and redistilled, giving 114.0 parts (33 percent) of purified ester, boiling point 87–88° C. at 1.8 millimeters of absolute pressure, $n^{25}D$ 1.3998. The product contained 31.05 percent carbon, 2.92 percent hydrogen, 32.64 percent fluorine, 9.11 percent phosphorus. The calculated percentages of these elements in $C_9H_{10}ClF_6O_3P$ are 31.18 percent carbon, 2.91 percent hydrogen, 32.89 percent fluorine, 8.94 percent phosphorus. This product is a new compound having the structure

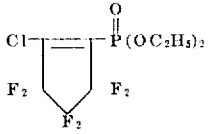

The lower-boiling fractions from the original distillation were combined and redistilled, giving 19.4 parts (26 percent) of a fraction, boiling point 34°–35° C., $n^{25}D$ 1.3532, identified by its odor and physical properties as diethyl ether, and 90.5 parts (28 percent) of another fraction, boiling point 50°–51° C. at 1.8 millimeters of absolute pressure, $n^{25}D$ 1.3818, identified by its analyses, and by the presence of a P-F band in its infrared spectrum at 900 centimeters- 1, as ethyl-2-chloro-3,3,4,4,5,5-hexafluoro-1-cyclopenten-1-ylphosphonofluridate.

The product contained 26.25 percent carbon, 1.50 percent hydrogen, 41.49 percent fluorine, 9.96 percent phosphorus. The calculated percentages of these elements in $C_7H_5ClF_7O_2P$ are 26.23 percent carbon, 1.57 percent hydrogen, 41.49 percent fluorine, 9.66 percent phosphorus.

This by-product is a new compound having the structure

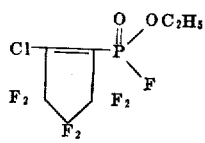

EXAMPLE 3

25.0 parts of tributyl phosphite were added dropwise to 22.9 parts of 1-chloro-2,3,3,4,4,5,5-heptafluorocyclopentene over a 45 minute period at 25°–30° C., with external cooling to moderate the exotherm. When the addition was completed, the solution was heated briefly to 100° C. to complete the reaction, and was then stripped to a final temperature of 110° C. at 0.77 millimeters of absolute pressure. Dibutyl-2-chloro-3,3,4,4,5,5-hexafluoro-1-cyclopenten-1-ylphosphonate was obtained as a viscous, colorless liquid, boiling point 48°–51° C. (bath temperature) at 0.0001 millimeters of absolute pressure, $n^{25}D$ 1.4091, in 88 percent yield. The product contained 8.6 percent chlorine, 8.28 percent phosphorus. The calculated percentages of these elements in $C_{13}H_{18}ClF_6O_3P$ are 8.81 percent chlorine, 7.70 percent phosphorus.

The presence of a double bond in this compound was established by a strong band in the infrared spectrum at 1,602 centimeters$^{-1}$, and by positive tests with permanganate in acetone and with bromine in carbon tetrachloride.

EXAMPLE 4

The reaction of 22.9 parts of 1-chloro-2,3,3,4,4,5,5-heptafluorocyclopentene with 19.8 parts of diethyl phenylphosphonite, following the procedure of example 1, gave 43.1 parts of the ethyl-2-chloro-3,3,4,4,5,5-hexafluoro-1-cyclopenten-1-ylphenylphosphinate as a low-melting solid, melting point 30°–42° C.. This product is a new compound having the structure

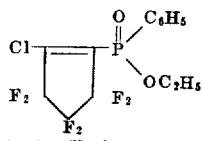

EXAMPLE 5

58.0 parts of diethyl-2-chloro-3,3,4,4,5,5-hexafluoro-1-cyclopenten-1-ylphosphonate prepared as described in example 2 were added dropwise over a 45 minute period to 500 parts of boiling 19 percent hydrochloric acid, heated at reflux until the gas evolution subsided, and then stripped to dryness under vacuum. The residue, 50.0 parts, was found to be only partially hydrolyzed. Further refluxing for 5 hours with 400 parts of 19 percent hydrochloric acid gave a semisolid mass from which 2-chloro-3,3,4,4,5,5-hexafluoro-1-cyclopenten-1-ylphosphonic acid was isolated as a crystalline solid, melting point 97°–99° C., after recrystallization from carbon tetrachloride. The product contained 11.7 percent chlorine. The calculated percentage of this element in $C_5H_2ClF_6O_3P$ is 12.22 percent chlorine. This acid is a new compound having the structure

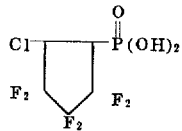

When equimolar quantities of a compound such as diethyl-2-chlorotetrafluoro-1-cyclobuten-1-ylphosphonate or diethyl-2-chlorooctafluoro-1-cyclohexen-1-ylphosphonate are used in place of diethyl-2-chlorohexafluoro-1-cyclopenten-1-ylphosphonate, the corresponding compound is obtained.

EXAMPLE 6

15.9 parts of ethyl-2-chloro-3,3,4,4,5,5-hexafluoro-1-cyclopenten-1-ylphenylphosphinate, prepared as described in example 4, were hydrolyzed by boiling for 9 hours with 200 parts of 19 percent hydrochloric acid. The crystalline solid which separated was collected on a filter, washed with water and dried, giving 10.3 parts (70 percent) of 2-chloro-3,3,4,4,5,5-hexafluoro-1-cyclopenten-1-ylphenylphosphinic acid, melting point 171°–172° C., after two recrystallizations from benzene. This acid is a new compound believed to have the structure

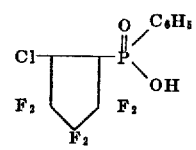

The product contained 38.28 percent carbon, 1.95 percent hydrogen, 9.9 percent chlorine, 33.02 percent fluorine, 9.03 percent phosphorus. The calculated percentages of these elements in $C_{11}H_6ClF_6O_2P$ are 37.68 percent carbon, 1.73 percent hydrogen, 10.11 percent chlorine, 32.52 percent fluorine, 8.84 percent phosphorus.

EXAMPLE 7

876 parts of phosphorus pentachloride were added in portions to 448 parts of tetraethyl-3,3,4,4,5,5-hexafluoro-1-cyclopenten-1,2-ylenediphosphonate, made as described in a co-pending application filed Mar. 8, 1965, at 75°–100°C., at a rate sufficient to maintain a vigorous evolution of ethyl chloride. When the gas evolution subsided (14 hours), the mixture was distilled at atmospheric pressure until most of the phosphorus oxychloride was removed. The temperature was then raised to 140° C. and the addition of phosphorus pentachloride was resumed. When no more ethyl chloride evolution could be induced nor phosphorus oxychloride distilled, the addition was stopped. The reaction mixture was cooled to 70° C., purged with sulfur dioxide and then with nitrogen, and distilled, giving 140.5 parts (45 percent) of 2-chloro-3,3,4,4,5,5-hexafluoro-1-cyclopenten-1-ylphosphonic dichloride, boiling point 49°–50° C., at 0.6 millimeters of absolute pressure, $n^{24}D$ 1.4299. The product contained 32.6 percent chlorine. The calculated percentage of this element in $C_5Cl_3F_6OP$ is 32.5 percent chlorine. This product is a new compound having the structure

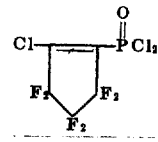

When equimolar quantities of a compound such as tetraethyltetrafluoro-1-cyclobuten-1,2-ylenediphosphonate or tetraethyl-octafluoro-1-cyclohexen-1,2-ylenediphosphonate are used in place of tetraethyl-hexafluoro-1-cyclopenten-1,2-ylenediphosphonate, the corresponding compound is formed.

When equimolar quantities of a compound such as phosphorus pentabromide are used in place of phosphorus pentachloride, the corresponding compound is obtained.

EXAMPLE 8

This example illustrates the preparation of the diphosphoryl compound employed in Example 7, by the process of co-pending application filed Mar. 8, 1965.

A mixture of 24.5 parts of 1,2-dichloro-3,3,4,4,5,5-hexafluorocyclopentene and 33.2 parts of triethyl phosphite was heated to reflux and maintained at reflux until the evolution of ethyl chloride subsided (30 minutes). At the end of this time a test for unreacted phosphite was found to be negative. The resulting solution was distilled, giving 6.5 parts (20 percent) of diethyl ethylphosphonate distilling at 65°–135° C., at 1 millimeter of absolute pressure, followed by 33.4 parts (74 percent) of tetraethyl-3,3,4,4,5,5-hexafluoro-1-cyclopenten-1,2-ylenediphosphonate, boiling point 122°–148° C., at 0.4 millimeter of absolute pressure. This product is a new compound having the structure

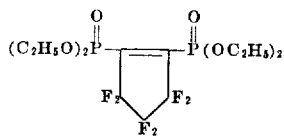

A portion of this product was redistilled, providing an analytical sample, boiling point 111°–112° C., at 0.1 millimeter of absolute pressure, and refractive index ($n^{20}D$) 1.4167. The product contained 35.09 percent carbon, 4.59 percent hydrogen, 25.27 percent fluorine, 13.3 percent phosphorus. The calculated percentages of these elements in $C_{13}H_{20}F_6O_6P_2$ are 34.83 percent carbon, 4.50 percent hydrogen, 25.43 percent fluorine, 13.82 percent phosphorus.

EXAMPLE 9

A solution of 114.0 parts of 3,3,4,4,5,5-hexafluoro-1-cyclopenten-1,2-ylenediphosphonic acid, prepared as described in co-pending application filed Mar. 8, 1965, in 840 parts of phosphorus oxychloride was treated with 298.0 parts of phosphorus pentachloride in several portions over a 30 minute period at 30°–40° C.. Gas evolution was brisk. The temperature was then raised gradually to 76° C. and held at 76° C. until the gas evolution subsided. Distillation of this solution gave 11.6 parts (25 percent) of 2-chloro-3,3,4,4,5,5-hexafluoro-1-cyclopenten-1-ylphosphonic dichloride, boiling point 52°–55° C., at 1.3 millimeters of absolute pressure, $n^{26}D$ 1.4281. The product contained 32.0 percent chlorine. The calculated percentage of this element in $C_5Cl_3F_6OP$ is 32.5 percent chlorine. A comparison of the infrared spectrum of this product with the product of example 7 showed that the two substances were identical.

EXAMPLE 10

32.8 parts of 2-chloro-3,3,4,4,5,5-hexafluoro-1-cyclopenten-1-ylphosphonic dichloride, prepared as described in example 7, were added dropwise to 200 parts of water over a 25 minute period at 25°–30° C. with external cooling, heated to boiling for 15 minutes to complete the hydrolysis, and then stripped to dryness under vacuum. The residue, 30.3 parts, was recrystallized three times from carbon tetrachloride, giving 2-chloro-3,3,4,4,5,5-hexafluoro-1-cyclopenten-1-ylphosphonic acid as a hygroscopic, crystalline solid, melting point 107°–109° C.. The product contained 20.77 percent carbon 0.87 percent hydrogen, 12.6 percent chlorine, 10.26 percent phosphorus. The calculated percentage of these elements in $C_5H_2ClF_6O_3P$ are 20.67 percent carbon, 0.69 percent hydrogen, 12.22 percent chlorine, 10.06 percent phosphorus.

The acid was soluble in water, ethanol and acetone, and insoluble in benzene, hexane and chloroform. A titration with 0.1 N sodium hydroxide solution gave a curve with inflections at pH 3.62 and 8.58.

EXAMPLE 11

To a solution of 4.6 parts of anhydrous ethanol and 10.1 parts of triethylamine in 70 parts of dry ether were added 16.4 parts of 2-chloro-3,3,4,4,5,5-hexafluoro-1-cyclopenten-1-ylphosphonic dichloride, prepared as described in example 7, over a 30 minute period at 25°–30° C.. Another 70 parts of ether was then added to facilitate stirring. After 1 hour the mixture was filtered and distilled, giving 14.7 parts (85 percent) of diethyl-2-chloro-3,3,4,4,5,5-hexafluoro-1-cyclopenten-1-ylphosphonate, boiling point 90°–92° C., at 1.5 millimeters of absolute pressure, $n^{24}D$ 1.4010. The product contained 10.3 percent chlorine, 8.62 percent phosphorus. The calculated percentages of these elements in $C_9H_{10}ClF_6O_3P$ are 10.23 percent chlorine, 8.94 percent of phosphorus.

A comparison of the infrared spectrum of this product with the product, boiling point 87°–88° C., at 1.8 millimeters of absolute pressure, $n^{24}D$ 1.3998, of example 2 showed that the two substances were identical.

What is claimed is:

1. A 2-halo-1-cycloalken-1-ylphosphonic acid of the formula

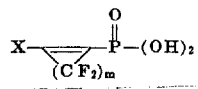

wherein X is selected from the group consisting of bromine and chlorine, and m is from 2 to 4.

2. 2-chlorohexafluoro-1-cyclopenten-1-ylphosphonic acid.

3. The compound of claim 1 wherein X is chlorine.

* * * * *